(12) United States Patent
Lakshminarayana

(10) Patent No.: US 7,328,136 B2
(45) Date of Patent: Feb. 5, 2008

(54) COMPUTER BASED METHOD FOR FINDING THE EFFECT OF AN ELEMENT IN A DOMAIN OF N-DIMENSIONAL FUNCTION WITH A PROVISION FOR N+1 DIMENSIONS

(75) Inventor: Sadasivuni Lakshminarayana, Visakhapatnam (IN)

(73) Assignee: Council of Scientific & Industrial Research, New Delhi (IN)

( * ) Notice: Subject to any disclaimer, the term of this patent is extended or adjusted under 35 U.S.C. 154(b) by 21 days.

(21) Appl. No.: 10/941,108

(22) Filed: Sep. 15, 2004

(65) Prior Publication Data

US 2006/0072812 A1    Apr. 6, 2006

(51) Int. Cl.
*G06F 15/00*   (2006.01)

(52) U.S. Cl. ......................................... 702/189; 707/6

(58) Field of Classification Search ................ 702/189; 707/6
See application file for complete search history.

(56) References Cited

U.S. PATENT DOCUMENTS

| | | | |
|---|---|---|---|
| 5,832,494 A * | 11/1998 | Egger et al. ................ 707/102 |
| 6,233,571 B1 * | 5/2001 | Egger et al. ................... 707/2 |
| 6,285,999 B1 * | 9/2001 | Page .............................. 707/5 |
| 6,560,600 B1 * | 5/2003 | Broder .......................... 707/7 |
| 6,654,742 B1 * | 11/2003 | Kobayashi et al. ............ 707/7 |
| 6,671,711 B1 * | 12/2003 | Pirolli et al. ................. 709/200 |
| 6,754,873 B1 * | 6/2004 | Law et al. ................ 715/501.1 |
| 6,799,176 B1 * | 9/2004 | Page .............................. 707/5 |
| 6,826,576 B2 * | 11/2004 | Lulich et al. ................ 707/102 |
| 6,871,202 B2 * | 3/2005 | Broder .......................... 707/7 |
| 2004/0111412 A1 * | 6/2004 | Broder .......................... 707/7 |
| 2004/0193698 A1 * | 9/2004 | Lakshminarayana ........ 709/218 |
| 2005/0027685 A1 * | 2/2005 | Kamvar et al. ................ 707/2 |
| 2005/0033742 A1 * | 2/2005 | Kamvar et al. ................ 707/7 |
| 2005/0065916 A1 * | 3/2005 | Ge et al. ....................... 707/3 |
| 2005/0080772 A1 * | 4/2005 | Bem .............................. 707/3 |
| 2005/0086260 A1 * | 4/2005 | Canright et al. ......... 707/104.1 |
| 2005/0114324 A1 * | 5/2005 | Mayer ............................ 707/3 |
| 2005/0165757 A1 * | 7/2005 | Broder .......................... 707/3 |
| 2005/0216533 A1 * | 9/2005 | Berkhin ..................... 707/204 |
| 2005/0234877 A1 * | 10/2005 | Yu ................................. 707/3 |
| 2005/0262062 A1 * | 11/2005 | Xia ............................... 707/3 |
| 2005/0278325 A1 * | 12/2005 | Mihalcea et al. .............. 707/6 |

OTHER PUBLICATIONS

Internet web page at www.vidyanidhi.org entitled "Vidyanidhi—Indian Theses Database—Search by Subject—Results", retrieved Feb. 15, 2006.*
Internet web page at www.ezinearticles.com entitled "google Page Rank Explained", retrieved Feb. 15, 2006.*
Brin et al., "The Anatomy of a Large-Scale Hypertextual Web Search Engine", from www-db.stanford.edu/~backrub/google.html retrieved Feb. 15, 2006.*

\* cited by examiner

*Primary Examiner*—Eliseo Ramos-Feliciano
*Assistant Examiner*—Janet Suglo
(74) *Attorney, Agent, or Firm*—Sughrue Mion, PLLC

(57) ABSTRACT

The method of the present invention quantifies the effect of an element present and absent in the set. This will enable the user to rate this element and place or rank it at the appropriate location. This enables for using ranking algorithms in vector functions too.

10 Claims, 1 Drawing Sheet

Figure 1:
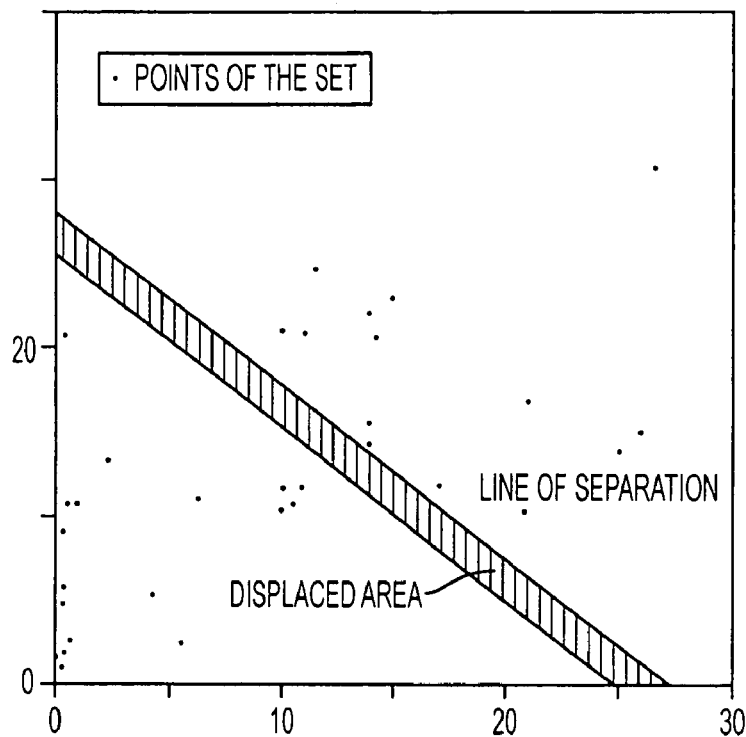

COMPUTER BASED METHOD FOR FINDING THE EFFECT OF AN ELEMENT IN A DOMAIN OF N-DIMENSIONAL FUNCTION WITH A PROVISION FOR N+1 DIMENSIONS

FIELD OF THE INVENTION

The present invention relates to a computer based method for finding the effect of an element in a domain of N-dimensional function with a provision for N+1 dimensions. The present invention relates to all functions which need a quantitative approach for an element in a domain. The method of the present invention can be applied to an additional dimension of the function i.e. N+1 dimension and to find the effect in such state.

BACKGROUND AND PRIOR ART DESCRIPTION

Many scientific and other applications depend on a set of data and their inter-relationship. The set of data is dependent normally on finite number of functions, which may or may not be inter dependent. Simplest way to understand the nature of an element in a set of data is to approach some of the statistical methods and find the relationships between them. The methods we consider are rank regression and use regression coefficients for a set of data to another set of data or find the ranks of each element of the set and understand the role of the particular element in the set. Studies are also available to Poison methods for models for probabilistic weighted retrieval methods (refer to Robertson, S. E., Walker. S., Some simple effective approximations to the 2 poison model for probabilistic weighted retrieval, in Proc. $17^{th}$ Annual international ACM SIGIR Conference on Research and Development in Information Retrieval, Association for Computing Machinery, New York, 1994, pp 232-241.

Ranking is one of the most important applications in several areas of life. It is also considered through several angles such as complexity of calculation, relevance, precision and recall etc. There are very few methods established till now to understand the relevance of an element in its domain (please refer to Karen Sparck Jones, Information retrieval and artificial intelligence, Artificial Intelligence V 114 (1999), 257-281, Elsevier Publication).

A case study with Web page to a particular query was addressed by Karen Sparck Jones uses artificial methods for understanding of a web page in a finite set. Examples are given in the area of web pages since the web is considered as most dynamically growing environment and needs addressing from several directions. Calculation of relevance, quantifying the page properties such as term frequency, inverse document frequency are well related to a particular query or a key word to that page. The present study is aimed at finding the overall effect of a particular page in the set. Though the examples taken are from a sub set of WWW, this method can be applied to any function that is N-dimensional vector based and each axis of the quantity has specific physical meaning to it. Statistical methods fail in addressing these problems because of non-availability of quantitative relationship of a particular element to the group.

BRIEF SUMMARY OF INVENTION

The method of the present invention quantifies the effect of an element present and absent in the set. This will enable the user to rate this element and place or rank it at the appropriate location. This enables for using ranking algorithms in vector functions too.

BRIEF DESCRIPTION OF THE ACCOMPANYING DRAWINGS

In the drawings accompanying the specification,

FIG. 1 represents 2-parameter view. The dots show the elements, lines show the damp1 and damp2 and colored are show the effect of the new element in the set.

Figure 2:
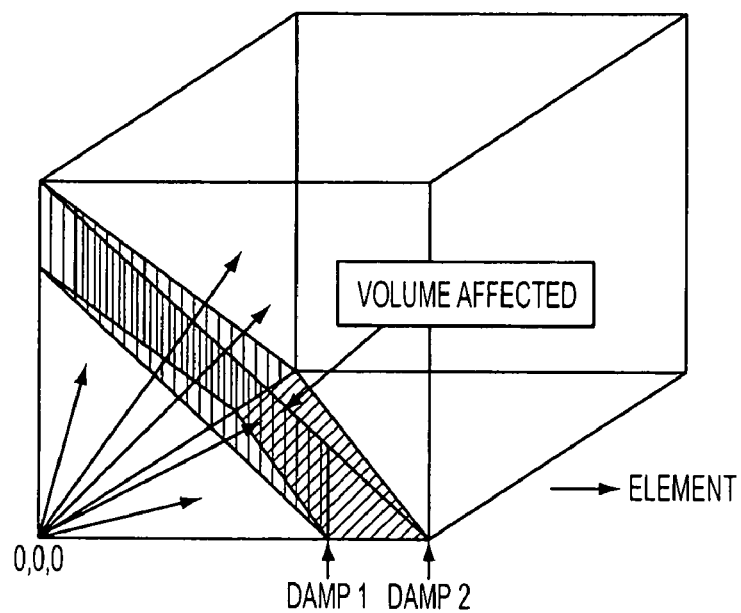

FIG. 2 shows the 3-parameter view. The arrows show the elements, sections show damp 1 and damp 2, colored volume show the effect of the new element in the set.

DETAILED DESCRIPTION OF THE INVENTION

Accordingly, the present invention provides a computer based method for calculating and finding the values of axis (axes) fraction, total fraction and a number, said method comprising the steps of:

(a) choosing a N-dimensional vector set having N number of elements;
(b) calculating a first damping factor (D1) for the N number of elements present in the vector set;
(c) adding a new element $[X_k, Y_k]$ to the N-dimensional vector set, wherein the properties of the new element on the entire vector set is to be examined;
(d) calculating the sum of the distances [S], from a line or plane or a higher dimension which is assumed to pass through [0, 0.01] and [0.01,0] to all the points of observation $[P_i]$;

$$S=\Sigma P_i$$

(e) calculating a second damping factor (D2) for N+1 number of elements present in the vector set;
(f) calculating axis fraction of the added element $[X_k, Y_k]$ using the formula:

Axis fraction of the added element $[X_k, Y_k]$= $\sigma/X_k+\sigma/Y_k$ wherein, $\sigma=D2-D1$, is the change of damping factor with the addition of the new element $[X_k, Y_k]$.
(g) forming a trapezium using the points [0, D1], [0, D2], [D2, 0] and [D1, 0], and calculating the area (A) or volume differentiated (V);
(h) calculating total fraction of the new element as S/A or S/V; and
(i) calculating the new number as:

New number=Axis fraction×Total fraction of the element.

In an embodiment of the present invention, step (a) includes identifying the elements in the set, assigning values to each elements in the set and normalizing all the axes to a common range.

In another embodiment of the present invention, assigning includes identifying the parameters by any process, mechanism or algorithm and processing through this method.

In yet another embodiment of the present invention, assigning includes identifying the parameters for the elements that are available in any domain, living or non-living or any machine based elements of a functionally grouped and ordering them through this method.

In still another embodiment of the present invention, assigning includes processing of grouped elements, compressed elements, automatic or manually generated elements and thereafter processing the said elements for ranking mechanism.

In one more embodiment of the present invention, assigning includes ranking of functions derived from diagrams, bars, pictures, movies, graphical, text, listings, directories, bookmarks or any elements that depend on a N-dimensional function with or without a provision for N+1 dimensions for the purpose of ranking.

In one another embodiment of the present invention, assigning includes all functions that are dependent on a finite number of parameters that could be computed or generated automatically or found statically and thereafter ranked through this method.

In a further embodiment of the present invention wherein in step (c), the new element is added to the vector set after normalization.

In a further more embodiment of the present invention, wherein the first and the second damping factors (D1 & D2) are iteratively increased until the sum of the distances [S] becomes zero.

In yet another embodiment of the present invention wherein the first and the second damping factors (D1 & D2) are obtained for a set of k points of the result set.

In WWW page weight algorithms are found by several researchers (refer to Yuwono B., D. Lee, In Proc. Of the 12th International conference on the data Engineering, New Orleans, La. (1996), pp 164-171; Kleinberg M Jon., in Proc of the ACM-SIAM Symposium on Discrete Algorithms (ACM-SIAM, New York/Philadelphia, 1998) pp. 668-677; Page, Lawrence. Method for node ranking in a linked database, U.S. Pat. No. 6,285,999, September, 2001; for the purpose of ranking them and delivering them to the search queries. Suitable algorithms were used in all these ranking methods and iterated for convergence if necessary but in no method the relation or any other factor is used for computation of page weight or term weight or any such factor. Distillation and ranking of web pages through topic distillation is done by Gianluigi et. al (Gianluigi Greco, Sergio Greco and Ester Zumpano, 2001, A probailistic approach for distillation and ranking of web pages, World Wide Web, Vol 4 (3) pp 189-207, Kluwer Academic Publishers) where in the page relevance is calculated. In this method, elements from N-dimensional function are considered for ranking. Each element is removed from the set and the nature of the rest is observed. A damping factor is computed which will separate the entire set into two parts with due consideration of all axes (properties). Then the element removed from the set is added and the damping factor is re-calculated. The difference of the old and new damping factors will be the affect of this added element to the whole set. Calculations are made to find the axes fraction and total fraction.

A new dimension could easily be added to the set of data and recalculate the entire damping factors and the fractions. These studies will give the overall nature and affect of the elements to the set.

Ranking is the most important process in any of the applications that are using the result sets deduced through a process, calculation or a computer program. The iteration, convergence and optimality are the factors that are to be addressed after careful usage of the ranked data set. The initial factor that used from the result set should be chosen carefully to avoid more number of iteration, far from convergence and optimality. Ranking is thus very important factor for any result set. To rank an element in its domain set we need to understand not only the parameters of itself but also the information about the whole domain and the effects of including this element in the whole set.

In this invention, initially a function is chosen that is dependent on two parameters that contribute whole value of the function. If P is the value of the parameter then, Pi=f (x,y) is the i-th value in the result set, where x and y are the parametric values of P. The Pi is the element that is to be studied in this process.

The values of x and y are to be normalized. The minimum value of x and y are taken as zero and maximum value as either one or any fixed value. All the intermediate values of x and y are scaled accordingly. Care is taken for the negative parameters for the value function that exist and these are negated, i.e. x=−x before normalizing. Here we need to understand the properties of the parameter; whether increasing the value of the parameter increases the functional value or not. If the parameter is of retarding nature to the function, we need to consider. We can use functional parameters if necessary. Ex: One of the parameter can be log (x) or sin (x) if the parameter is of such nature to the function.

The function P is a two dimensional vector quantity that represent x, and y as values ranging from fixed zero to finite quantity. The result set of the function thus has several P's [k in number] that are to be studied. A very small damping value is chosen initially say 0.01 and a line is assumed through [0,0.01] and [0.01,0]. The distances from all $P_i$ to the line are calculated. All points inside the axis are assumed as negative distance and outside the line are assumed as positive. The value of S=Σ Pi is the sum of the distances from the line to all the points of observation i.e. sum of the distances of k points is found. The damping factor is increased iteratively until this sum becomes zero. Thus the damping factor D1 is obtained for a set of k points of result set. It is also evident that the result set is separated into two groups which are on the either side of the plane.

An element $[X_k, Y_k]$ whose effects on the subset are to be found is then added to the subset. The value of S is again calculated. The S value is the effect adding this new element to the subset. The process of finding a new damping factor [D2] is repeated.

σ=D2−D1 the change of damping factor with the addition of the new element.

A new fraction [axis fraction] is then found as below:

Axis fraction of the element=σ/$Xk$+/σ$Y_k$

Area of displacement for the line D1 and D2 are computed (say A). A new fraction [Total fraction] is calculated as below. Total fraction of the element is S/A. The product of these two is named as an indicator of the element to the set. The New Number (hereafter being called as SLN number)=Axis fraction×Total fraction of the element. The same process can be extended to three dimensional quantities with replacing the line as plane and area as volume to the set.

This same process can be extended to N+1 dimension too using the following formula.

$$\text{Distance} = \left(\sum_{1}^{n} Xi - D\right) \Big/ \sqrt{n}$$

Where D is the damping value, n is the number of dimensions to be considered Xj is the vector from which we need to compute the distance.

$$S = \sum_{1}^{k} \text{Distance},$$

where $k$ is the total number of elements that are in the set.

Modifications in the Data Required Before Analysis:
The data should be suitably normalized before process.
If the data has any zero values, we need to transform the axis suitably so that no zero values are there in the set. As we are interested in the rank, there is no much importance for the value of the element.
If a parameter is of retarding nature, we need to modify the set of data to negative order so that all the axes are of same nature.

The present invention is not a mathematical formula. It is a specific computer based method employed in ranking in vector functions to quantifies the effect of an element present and absent in the set and to enable the user to rate this element and place or rank it at the appropriate location for using ranking algorithms in vector functions too. The present invention is described herewith following illustration, which should not be construed to limit the scope of the invention.

EXAMPLE 1

A two dimensional vector set is chosen. The set contains the following elements: (2,3), (3,2), (5,5), (6,1), (1,3), (1,4) initially. Damping factor [D1] is calculated with these elements=D1=6.001.

A new element whose properties are to be found (5,3) is then added to the set of the above subset. Sum of S=ΣPi is the sum of the distances is computed=S=1.4139.

The process of finding the damping factor is repeated and D2 is obtained=D2=6.2856.

Axis fraction of the element=$\sigma/X_k + \sigma/Y_k$ is calculated=(0.2856/5)+(0.2856/3)=0.15232.

The area of the trapezium (0, 6.001), (0, 6.2856), (6.2856, 0) and (6.001. 0) is computed. This is the area that is shifted because of the addition of the new element to the subset. The Area A=1.7375.

Total fraction of the new element is S/A=1.4139/1.7375=0.8138

Number=Axis fraction×Total fraction of the element. 0.15232×0.8138=0.124.

This number is an indicator of the element to the set chosen.

EXAMPLE 2

In the second example the original data set is taken Initially the set contains (2,3), (3,2), (5,5), (6,1), (1,3), (1,4).

Damping factor [D1] is calculated with these elements=D1=6.001

A new element whose properties are to be found (2,1) is then added to the set of the above subset.

Sum of S=Σ Pi is the sum of the distances is computed=S=−2.1266

The process of finding the damping factor is repeated and D2 is obtained=D2=5.56

Axis fraction of the element=$\sigma/X_k + \sigma/Y_k$ is calculated =−(0.441/2)+40.441/1)=0.6615

The area of the trapezium (0, 5.56), (0, 6.001), (6.001, 0) and (5.56, 0) is computed.

This is the area that is shifted because of the addition of the new element to the subset.

The Area A=2.5492.

Total fraction of the new element is S/A=−2.1266/2.5492=−0.8342.

Number=Axis fraction×Total fraction of the element=0.6615×−0.8342=−0.5518 This number is an indicator of the element to the set chosen. Negative sign indicates that this element is in the lower triangle of the subset.

EXAMPLE 3

With Three Dimensions

A three dimensional vector set is chosen. The set contains the elements (2,3,2), (3,2,4), (5,5,3), (6,1,6), (1,3,1), (1,4,2) initially. Damping factor [D1] is calculated with these elements=D1=9.000

A new element whose properties are to be found (5, 3, 2) is then added to the set of the above subset. Sum of S=ΣPi is the sum of the distances is computed=S=0.5774.

The process of finding the damping factor is repeated and D2 is obtained. D2=9.14.

Axis fraction of the element=$\sigma/X_K + \sigma/Y_k + \sigma/Z_k$ is calculated as (0.14/5)+(0.14/3)+(0.14/2)=0.1446.

The displacement happens in this case is volumetric and the Volume of the trapezoid (0, 6.001), (0, 6.2856), (6.2856, 0) and (6.001, 0) is computed. This is the area that is shifted because of the addition of the new element to the subset.

Volume differentiated V=17.27597

Total fraction of the new element is S/V=0.5774/17.27597=0.0334221

Number=Axis fraction×Total fraction of the element as 0.1446×0.0334221=0.0048161. This number is an indicator of the element to the set chosen.

EXAMPLE 4

This example is to address a practical problem in Web ranking. Table 1 shows the properties of 21 files collected randomly from the web for analysis of the problem. P is the ratio of the number of the keywords in a page to the number of the out going links in that page. Q is the ratio of the number of the out going links in a page to the total number of words in that page.

TABLE 1

| Information Table | | | | | | |
|---|---|---|---|---|---|---|
| No | P | Q | Af | Ar | Tf | SLN |
| 1 | 1.4 | 0.3 | 0.84 | 1.22 | −2.5 | −2.09 |
| 2 | 3.5 | 0.6 | 0.17 | 0.51 | −2.53 | −0.43 |
| 3 | 2.5 | 0.8 | 0.21 | 0.75 | −2.52 | −0.53 |
| 4 | 13.3 | 0.5 | −0.83 | −2.24 | −2.64 | 2.18 |
| 5 | 1.9 | 0.6 | 0.37 | 0.98 | −2.51 | −0.92 |
| 6 | 40 | 0.01 | −170.89 | −8.5 | −2.99 | 510.25 |
| 7 | 0.1 | 0.7 | 2.88 | 1.5 | −2.49 | −7.17 |
| 8 | 1.8 | 0.5 | 0.45 | 1.04 | −2.51 | −1.13 |
| 9 | 1.6 | 0.5 | 0.49 | 1.1 | −2.51 | −1.23 |
| 10 | 3.3 | 0.1 | 1.25 | 0.72 | −2.52 | −3.15 |
| 11 | 3.3 | 0.3 | 0.41 | 0.66 | −2.52 | −1.03 |
| 12 | 0.7 | 0.7 | 0.63 | 1.32 | −2.5 | −1.58 |
| 13 | 0.5 | 0.5 | 0.97 | 1.44 | −2.5 | −2.41 |
| 14 | 2.9 | 0.7 | 0.2 | 0.66 | −2.52 | −0.5 |
| 15 | 16.7 | 0.3 | −1.9 | −3.1 | −2.68 | 5.07 |
| 16 | 4.4 | 1.1 | 0.02 | 0.1 | −2.53 | −0.05 |
| 17 | 3.2 | 0.6 | 0.2 | 0.6 | −2.52 | −0.51 |
| 18 | 1.1 | 0.4 | 0.74 | 1.29 | −2.5 | −1.85 |
| 19 | 6.9 | 0.4 | −0.19 | −0.43 | −2.57 | 0.5 |

TABLE 1-continued

Information Table

| No | P | Q | Af | Ar | Tf | SLN |
|---|---|---|---|---|---|---|
| 20 | 1.2 | 0.1 | 2.45 | 1.35 | −2.5 | −6.13 |
| 21 | 2 | 0.4 | 0.51 | 1.01 | −2.51 | −1.29 |

Af is the axis fraction, Ar is the area, Tf is the total fraction and SLN is the new number attributed to the element in the set computed in this method.

TABLE 2

Ranked order of the data of table 1

Rank order of the 21 files (ascending) - 2 parameters

| | |
|---|---|
| P | 7, 13, 12, 18, 20. 1, 9, 8, 5, 21, 3, 14, 17. 10, 11, 2, 16, 19, 4, 15, 6 |
| Q | 6, 10, 20, 1, 11, 15, 18, 19, 21, 4, 8, 9, 13, 2, 5, 17, 7, 12, 14, 3, 16 |
| Axis fraction | 6, 15, 4, 19, 16, 2, 14, 17, 3, 5, 11, 8, 9, 21, 12, 18, 1, 13, 10, 20, 7 |
| Area | 6, 15, 4, 19, 16, 2, 17, 11, 14, 10, 3, 5, 21, 8, 9, 1, 18, 12, 20, 13, 7 |
| Total fraction | 6, 15, 4, 19, 2, 16, 3, 10, 11, 14, 17, 5, 8, 9, 21, 1, 12, 13, 18, 20, 7 |
| SLN Number | 7, 20, 10, 13, 1, 18, 12, 21, 9, 8, 11, 5, 3, 17, 14, 2, 16, 19, 4, 15, 6 |

The new number calculated will give the importance of the file in the set of data. Since the order in ascending order, it is easy to attribute that the page number 7 is the lowest importance in this set, where as page number 6 has highest rank in this set.

The above example is addressed a practical problem in Web ranking with two parameters considered for such ranking. For the same set of data another parameter S50 through a method is calculated [McBrayn] and considered as the third axis for analysis. Table 3 again shows the properties of 21 files collected previously with 3 $^{rd}$ parameter added. In this case P is the ratio of the number of the keywords in a page to the number of the out going links in that page. Q is the ratio of the number of the out going links in a page to the total number of words in that page. R is the frequency of the keyword in the distance of 50 bytes [McBrayn].

For the WWW, an additional dimensional vector space models are more suitable the ranking techniques and this method applies such proposition.

TABLE 3

Information Table

| S No | P | Q | R | Af | Ar | Tf | SLN |
|---|---|---|---|---|---|---|---|
| 1 | 1.40 | 0.30 | 0.46 | 0.13 | 0.03 | −7.27 | −0.94 |
| 2 | 3.50 | 0.60 | 0.60 | 0.01 | 0.00 | −7.31 | −0.06 |
| 3 | 2.50 | 0.80 | 0.73 | −0.00 | −0.00 | −7.74 | 0.02 |
| 4 | 13.30 | 0.50 | 0.14 | −0.22 | −0.04 | −7.61 | 1.67 |
| 5 | 1.90 | 0.60 | 0.66 | 0.02 | 0.01 | −7.35 | −0.18 |
| 6 | 40.00 | 0.01 | 0.01 | −29.58 | −0.21 | −8.59 | 254.02 |
| 7 | 0.1 | 0.70 | 0.78 | 0.12 | 0.02 | −7.34 | −0.86 |
| 8 | 1.80 | 0.50 | 0.16 | 0.29 | 0.06 | −7.19 | −2.07 |
| 9 | 1.60 | 0.50 | 0.90 | −0.01 | −0.01 | −7.52 | 0.09 |
| 10 | 3.30 | 0.1 | 0.09 | 0.66 | 0.05 | −7.20 | −4.74 |
| 11 | 3.30 | 0.30 | 0.23 | 0.18 | 0.04 | −7.26 | −1.32 |
| 12 | 0.70 | 0.70 | 0.51 | 0.09 | 0.03 | −7.28 | −0.69 |
| 13 | 0.50 | 0.50 | 0.78 | 0.04 | 0.01 | −7.34 | −0.32 |
| 14 | 2.90 | 0.70 | 1.60 | −0.11 | −0.07 | −7.77 | 0.85 |
| 15 | 16.70 | 0.30 | 0.12 | −0.45 | −0.06 | −7.71 | 3.51 |

TABLE 3-continued

Information Table

| S No | P | Q | R | Af | Ar | Tf | SLN |
|---|---|---|---|---|---|---|---|
| 16 | 4.40 | 1.10 | 0.93 | −0.05 | −0.03 | −7.59 | 0.37 |
| 17 | 3.20 | 0.60 | 0.28 | 0.11 | 0.03 | −7.28 | −0.78 |
| 18 | 1.10 | 0.40 | 0.13 | 0.42 | 0.06 | −7.15 | −3.03 |
| 19 | 6.90 | 0.40 | 0.29 | 0.01 | 0.00 | −7.24 | −0.05 |
| 20 | 1.20 | 0.1 | 0.23 | 0.52 | 0.06 | −7.18 | −3.73 |
| 21 | 2.00 | 0.40 | 0.05 | 0.87 | 0.06 | −7.16 | −6.21 |

In the above table, information regarding the following are provided: serial number of the element, Ratio of the number of key words in a page to the number of outgoing links in that page (P), Ratio of the number of outgoing links in a page to the total number of words in that page (Q), The frequency of the keywords with in the distance of 50 bytes (R), Axes fraction computed (Af), Area fraction computed (Ar), Total fraction computed (Tf) and the SLN number computed (SLN)

TABLE 4

Rank Order of the P, Q, R, Axes fraction, Area fraction, Total fraction and SLN number is given Rank order of the 21 files (ascending) - 3 parameters

| | |
|---|---|
| P | 7, 13, 12, 18, 20, 1, 9, 8, 5, 21, 3, 14, 17, 10, 11, 2, 16, 19, 4, 15, 6 |
| Q | 6, 10, 20, 1, 11, 15, 18, 19, 21, 4, 8, 9, 13, 2, 5, 17, 7, 12, 14, 3, 16 |
| R | 6, 21, 10, 15, 18, 4, 8, 11, 20, 17, 19, 1, 12, 2, 5, 3, 7, 13, 9, 16, 14 |
| Axis fraction | 6, 15, 4, 14, 16, 9, 3, 2, 19, 5, 13, 12, 17, 7, 1, 11, 8, 18, 20, 10, 21 |
| Area | 6, 14, 15, 4, 16, 9, 2, 3, 19, 5, 13, 7, 1, 12, 17, 11, 10, 8, 18, 20, 21 |
| Total fraction | 6, 14, 3, 15, 4, 16, 9, 5, 7, 13, 2, 12, 17, 1, 11, 19, 10, 8, 20, 21, 18 |
| SLN Number | 21, 10, 20, 18, 8, 11, 1, 7, 17, 12, 13, 5, 2, 19, 3, 9, 16, 14, 4, 15, 6 |

The new number calculated will give the importance of the file in the set of data considering all the three parameters of the function. Since the order in ascending order, it is easy to attribute that the page number 21 is the lowest importance in this set, where as page number 6 has highest rank in this set. The same has been done in table 5.

TABLE 5

Rank in 2 and 3 dimensions of an element

| Element Number | Rank in 2-dimensions | Rank in 3-dimensions |
|---|---|---|
| 1 | 17 | 15 |
| 2 | 6 | 9 |
| 3 | 9 | 7 |
| 4 | 3 | 3 |
| 5 | 10 | 10 |
| 6 | 1 | 1 |
| 7 | 21 | 14 |
| 8 | 12 | 17 |
| 9 | 13 | 6 |
| 10 | 19 | 20 |
| 11 | 11 | 16 |
| 12 | 15 | 12 |
| 13 | 18 | 11 |
| 14 | 7 | 4 |
| 15 | 10 | 2 |
| 16 | 5 | 5 |

TABLE 5-continued

Rank in 2 and 3 dimensions of an element

| Element Number | Rank in 2-dimensions | Rank in 3-dimensions |
|---|---|---|
| 17 | 8 | 13 |
| 18 | 18 | 18 |
| 19 | 4 | 8 |
| 20 | 20 | 19 |
| 21 | 14 | 21 |

From table 5 we can deduce, that pages (elements) 1,3,7,9,12,13,14,15 and 20 are negatively affected, 2,8,10, 11,17,18,19,21 are positively affected and there is no affect on 4,5,6 and $16^{th}$ elements after adding the 3-rd parameter for computation. We can also observe that 9 elements decreased the rank, 8 elements increased their rank and 4 have no affect on 3-rd parameter adding for computation. Further the 3-rd parameter has 42% negative nature (9+21=0.42), 38% of positive nature (8+21=0.38) and 0.19 of neutral nature (4+21=0.19) on the set. This classifies the parameter to the set chosen.

It is easy to extend the process of calculation to any finite N dimensions for rank calculations.

Advantages with the SLN Number:
- This number is derived with ratio's that affected the axes and hence a direct relationship exists.
- The number is derived from the entire set parameters thus giving the importance of this element considering of the entire set chosen.
- The number speaks more than Precision and Recall. Precision is the ratio of number of documents of existence of a key word or query to that of total number of documents retrieved. Recall is again ratio of number of documents of existence of a key word or query to that of relevant documents retrieved. But precision and recall does not spread to multidimensional approach.
- Classify the parameters on the set. (Negative, Positive and Neutral). See in Example 4 for details.

The invention claimed is:

1. A computer based method for calculating and finding the values of axis (axes) fraction, total fraction and a number, said method comprising the steps of:
choosing a N-dimensional vector set having N number of elements;
calculating a first damping factor (D1) for the N number of elements present in the vector set;
adding a new element $[X_k, Y_k]$ to the N-dimensional vector set, wherein the properties of the new element on the entire vector set is to be examined;
calculating the sum of the distances [S], from a line or plane or a higher dimension which is assumed to pass through [0, 0.01] and [0.01,0] to all the points of observation $[P_i]$;

$S=\Sigma P_i$ calculating a second damping factor (D2) for N+1 number of elements present in the vector set;
calculating axis fraction of the added element $[X_k, Y_k]$ using the formula:

Axis fraction of the added element $[X_k, Y_k]$=
$\sigma/X_k=\sigma/Y_k$ wherein, $\sigma$=D2-D1, is the change of damping factor with the addition of the new element $[X_k, Y_k]$
forming a trapezium using the points [0,D1],[0,D2],[D2, 0] and [D1,0], and calculating the area (A) or volume differentiated (V);
calculating total fraction of the new element as S/A or S/V;
calculating New number=Axis fraction X Total fraction of the element;

and providing the new number as a result of the method.

2. A computer based method as claimed in claim 1, wherein step (a) includes identifying the elements in the set, assigning values to each elements in the set and normalizing all the axes to a common range.

3. A computer based method as claimed in claim 2, wherein assigning includes identifying the parameters.

4. A computer based method as claimed in claim 2, wherein assigning includes identifying the parameters for the elements and ordering them through this method.

5. A computer based method as claimed in claim 2, wherein assigning includes processing of grouped elements, compressed elements, automatic or manually generated elements and thereafter processing the said elements for ranking mechanism.

6. A computer based method as claimed in claim 2, wherein assigning includes ranking of functions derived from diagrams, bars, pictures, movies, graphical, text, listings, directories, bookmarks or any elements that depend on a N-dimensional function with or without a provision for N+1 dimensions for the purpose of ranking.

7. A computer based method as claimed in claim 2, wherein assigning includes all functions that are dependent on a finite number of parameters that could be computed or generated automatically or found statically and thereafter ranked through this method.

8. A computer based method as claimed in claim 1 wherein in step (c), the new element is added to the vector set after normalization.

9. A computer based method as claimed in claim 1 wherein the first and the second damping factors (D1 & D2) are iteratively increased until the sum of the distances [S] becomes zero.

10. A computer based method as claimed in claim 1 wherein the first and the second damping factors (D1 & D2) are obtained for a set of k points of the result set.

* * * * *